United States Patent
Garoutte

(10) Patent No.: US 7,218,756 B2
(45) Date of Patent: May 15, 2007

(54) VIDEO ANALYSIS USING SEGMENTATION GAIN BY AREA

(75) Inventor: Maurice V. Garoutte, Dittmer, MO (US)

(73) Assignee: Cernium, Inc., Webster Groves, MO (US)

( * ) Notice: Subject to any disclaimer, the term of this patent is extended or adjusted under 35 U.S.C. 154(b) by 0 days.

(21) Appl. No.: 11/088,308

(22) Filed: Mar. 24, 2005

(65) Prior Publication Data

US 2005/0213815 A1 Sep. 29, 2005

Related U.S. Application Data

(60) Provisional application No. 60/555,817, filed on Mar. 24, 2004.

(51) Int. Cl.
*G06K 9/00* (2006.01)

(52) U.S. Cl. .................. 382/103; 382/236; 348/143

(58) Field of Classification Search .............. 382/103, 382/104, 106, 107, 123, 155, 169–172, 173, 382/191, 194, 203, 224, 260, 274–275, 286, 382/294, 192; 348/143, 154; 340/541; 380/200; 392/192

See application file for complete search history.

(56) References Cited

U.S. PATENT DOCUMENTS

| | | | |
|---|---|---|---|
| 4,679,077 A | 7/1987 | Yuasa et al. | |
| 4,774,570 A | 9/1988 | Araki | |
| 5,731,832 A | 3/1998 | Ng | |
| 5,930,379 A | 7/1999 | Rehg et al. | |
| 5,956,424 A * | 9/1999 | Wootton et al. | 382/192 |
| 5,969,755 A | 10/1999 | Courtney | |
| 6,104,831 A * | 8/2000 | Ruland | 382/173 |
| 6,154,133 A * | 11/2000 | Ross et al. | 340/541 |
| 6,366,701 B1 | 4/2002 | Chalom et al. | |
| 6,396,961 B1 * | 5/2002 | Wixson et al. | 382/294 |
| 6,424,370 B1 * | 7/2002 | Courtney | 348/143 |
| 6,493,041 B1 | 12/2002 | Hanko et al. | |
| 6,597,800 B1 * | 7/2003 | Murray et al. | 382/103 |
| 6,654,483 B1 * | 11/2003 | Bradski | 382/107 |
| 6,661,918 B1 | 12/2003 | Gordon et al. | |
| 2001/0033330 A1 | 10/2001 | Garoutte | |
| 2003/0219157 A1 | 11/2003 | Koide et al. | |
| 2003/0228056 A1 | 12/2003 | Prakash et al. | |

\* cited by examiner

*Primary Examiner*—Jingge Wu
*Assistant Examiner*—Seyed Azarian
(74) *Attorney, Agent, or Firm*—Peter S. Gilster; Greensfelder, Hemker & Gale, P.C.

(57) ABSTRACT

Video segmentation wherein scene images of subjects and background are captured by video and are automatically segmented according to subject content, as by system determination of the nature of subjects, but segmentation of the subjects can be compromised by visual noise. Segmentation transformations of an original background and foreground images in the scenes are provided as a terrain map, and the segmentation may also incorporate noise blobs. Automatic segmentation threshold adaptation is based on measuring the segmentation noise while holding the number count of noise blobs constant, whereby to achieve noise-adaptive segmentation gain. Automatic threshold adaptation within multiple areas of the scene results in different possible thresholds in different areas based on the amount of segmentation noise in each area. Segmentation is improved accordingly.

10 Claims, 11 Drawing Sheets

VIDEO ANALYSIS USING SEGMENTATION GAIN BY AREA

CROSS-REFERENCE TO RELATED APPLICATION

This application claims the priority of U.S. provisional patent application Ser. No. 60/555,817, filed Mar. 24, 2004, entitled IMPROVEMENT IN VIDEO ANALYSIS USING SEGMENTATION GAIN BY AREA.

BACKGROUND OF THE INVENTION

1. Field of the Invention

The invention relates to video monitoring and interpretation, as by software-aided methodology, and more particularly, to a system and method for improving the utility of video images in systems handling video, such as for system-interpreted analysis of video images for security purposes, and for many other purposes.

2. Description of Prior System

There has been developed a system of the present inventor in accordance with U.S. patent application Ser. No. 09/773,475, filed Feb. 1, 2001, entitled SYSTEM FOR AUTOMATED SCREENING OF SECURITY CAMERAS, and corresponding International Patent Application PCT/US01/03639, of the same title, filed Feb. 5, 2001, both assigned to the same entity as the assignee/intended assignee of the present application, and both herein incorporated by reference. That system, also called a security system, may be identified by the trademark PERCEPTRAK herein. PERCEPTRAK is a registered trademark (Regis. No. 2,863,225) of Cernium, Inc., applicant's assignee/intended assignee, to identify video surveillance security systems, comprised of computers; video processing equipment, namely a series of video cameras, a computer, and computer operating software; computer monitors and a centralized command center, comprised of a monitor, computer and a control panel.

The general term "software" is herein simply intended for convenience to mean programs, programming, program instructions, code or pseudo code, process or instruction sets, source code and/or object code processing hardware, firmware, drivers and/or utilities, and/or other digital processing devices and means, as well as software per se.

In the PERCEPTRAK security system, video data is picked up by any of many possible video cameras. It is processed by software control of the system before human intervention for an interpretation of types of images and activities of persons and objects in the images. As the video may be taken by video cameras in any of many possible locations and under conditions subject to variation beyond the control the system, the captured video can include useless information such as visible "noise" which, upon segmentation of images together with such noise, interferes with usable information or detracts from or degrades video data useful to the system. More specifically, the PERCEPTRAK system provides automatically screening of closed circuit television (CCTV) cameras ("video cameras") for large and small scale security systems, as used for example in parking garages. The PERCEPTRAK system includes six primary software elements, each of which performs a unique function within the operation of such system to provide intelligent camera selection for operators, resulting in a marked decrease of operator fatigue in a CCTV system. Real-time video analysis of video data is performed wherein a single pass of a video frame produces a terrain map which contains elements termed primitives which are low level features of the video. Based on the primitives of the terrain map, the system is able to make decisions about which camera an operator should view based on the presence and activity of vehicles and pedestrians and furthermore, discriminates vehicle traffic from pedestrian traffic. The system is compatible with existing CCTV (closed circuit television) systems and is comprised of modular elements to facilitate integration and upgrades.

The PERCEPTRAK system is capable of automatically carrying out decisions about which video camera should be watched, and which to ignore, based on video content of each such camera, as by use of video motion detectors, in combination with other features of the presently inventive electronic subsystem, constituting a processor-controlled selection and control system ("PCS system"), which serves as a key part of the overall security system, for controlling selection of the CCTV cameras. The PCS system is implemented to enable automatic decisions to be made about which camera view should be displayed on a display monitor of the CCTV system, and thus watched by supervisory personnel, and which video camera views are ignored, all based on processor-implemented interpretation of the content of the video available from each of at least a group of video cameras within the CCTV system.

Included in the PCS system are video analysis techniques which allow the system to make decisions about which camera an operator should view based on the presence and activity of vehicles and pedestrians. Events are associated with both vehicles and pedestrians and include, but are not limited to, single pedestrian, multiple pedestrians, fast pedestrian, fallen pedestrian, lurking pedestrian, erratic pedestrian, converging pedestrians, single vehicle, multiple vehicles, fast vehicles, and sudden stop vehicle.

The video analysis techniques of the PERCEPTRAK system can discriminate vehicular traffic from pedestrian traffic by maintaining an adaptive background and segmenting (separating from the background) moving targets. Vehicles are distinguished from pedestrians based on multiple factors, including the characteristic movement of pedestrians compared with vehicles, i.e. pedestrians move their arms and legs when moving and vehicles maintain the same shape when moving. Other factors include the aspect ratio and object smoothness. For example, pedestrians are taller than vehicles and vehicles are smoother than pedestrians.

The analysis is performed on the terrain map primitives, in accordance with the disclosure of said U.S. patent application Ser. No. 09/773,475, to which reference should be had. Generally, Terrain Map is generated from a single pass of a video frame, resulting in characteristic information regarding the content of the video. Terrain Map creates a file with characteristic information.

The informational content of the video generated by Terrain Map is the basis for video analysis techniques of the PERCEPTRAK system and results in the generation of several parameters for further video analysis. These parameters include at least:

(1) Average Altitude; (2) Degree of Slope; (3) Direction of Slope; (4) Horizontal Smoothness; (5) Vertical Smoothness; (6) Jaggyness; (7) Color Degree; and (8) Color Direction.

The PCS system of the PERCEPTRAK system disclosed in said U.S. patent application Ser. No. 09/773,475 comprises a number of primary software-driven system components, as shown therein, including those termed:

(1) Analysis Worker(s);
(2) Video Supervisor(s);

(3) Video Worker(s);

(4) Node Manager(s);

(5) PsAdministrator (formerly called Set Rules GUI (Graphical User Interface); and (6) Arbitrator.

In the PERCEPTRAK system, as here described generally, video input from security cameras is first sent to a Video Worker, which captures frames of video (frame grabber) and has various properties, methods, and events that facilitate communication with the Video Supervisor. There is one Video Supervisor for each frame grabber. The Analysis Workers perform video analysis on the video frames captured by the Video Worker and subsequently report activity to the Video Supervisor. Similarly, the Analysis Workers have various properties, methods, and events that facilitate communication with the Video Supervisor. The Video Supervisor keeps track of when frames are available from the Video Worker and when the Analysis Worker is prepared for another frame, and directs data flow accordingly. The Video Supervisor then sends data to the Node Manager, which in turn concentrates the communications from multiple Video Supervisors to the Arbitrator, thereby managing and decreasing the overall data flow to the Arbitrator.

The general term "software" is herein used and intended simply for convenience to mean programs, program instructions, code or pseudo code, process or instruction sets, source code and/or object code processing hardware, firmware, drivers and/or utilities, and/or other digital processing devices and means, as well as software per se.

Adaptive Segmentation Gain

Area-specific adaptive segmentation threshold, is employed, in areas of video to be segmented, in accordance with the invention. It is herein preferred to use the alternative terminology "adaptive segmentation gain". Such adaptive segmentation gain is used to advantage in the PERCEPTRAK system (sometimes hereinafter simply referred to as "the system", as described in said patent application), and said system is here representative of possible systems which could employ the present invention for the present or comparable purposes. There, as just one exemplary technique which can be used, a PID control loop can be used at each Analysis Worker, and such a "PI loop" attempts to maintain a fixed amount of segmentation noise . Heretofore, in the PERCEPTPAK system segmentation noise was measured screen wide for each video frame. An average of many frames was used to make segmentation gain changes. In scenes where there is an excessive amount of motion in a part of the screen, the prior approach caused the overall segmentation gain to be reduced screen wide in order to maintain the fixed amount of total noise in the scene. Sometimes the noise was seen only in a small part of the scene that had continual noise.

A difficulty has been realized in that segmentation gain can be very low in "quiet" (relatively noise-free) areas of the scene, but noise elsewhere in the image may have the result that subjects (such as people) within the image field are only partially segmented.

For example, in a scene to be captured by video, a tree (or other vegetation) may exist. Light streams through or is reflected off the foliage of the tree or vegetation in an indefinite pattern, which may shift upon limb or leaf motion resulting from air movement. Such shifting or sporadic light produces small areas of relative difference in light intensity, recognizable as, or considered to be, small bits of noise, over a period of time. As a result, the moving limbs of vegetation are segmented because they are different from the background. In simplest terms, there may be segmented "blobs" which are segmented because they contain noise, which now show in the illustrations as (e.g., a rectangles) in portions of the segmented portions of image. White spots in such a representative rectangle example signify "noise blobs" resulting from the segmentation, and term "noise blobs" is used to connote herein the segmented areas resulting from noise, and are thus noise blobs are tangible image artifacts of noise captured by segmentation of subjects in scenes. For example, FIG. 3 shows noise blobs appearing as white spots.

According to a most preferred mode of operation, an area of 5 pixels by 5 pixels may be used as the cut-off, or minimum size, of a blob to be segmented.

The noise blobs can be counted. The count usefully indicates the extent to which noise blobs are being segmented and the count used to control the threshold ("gain") of segmentation.

Heretofore, to get useful data, given the noise within a video frame (where video is captured frame by frame), it has been a practice to measure noise over an average of many frames. In the PERCEPTRAK system, for example, the average can then be used to make overall segmentation gain changes. In other words, segmentation intensity levels (gain) can be continuously controlled over a group of 100 (for example) frames at a time. A difficulty exists in that changes in gain are controlled not only in response to objects in the captured video, which objects it is desired that the system segment, but also in response to light "noise." Such visual noise degrades segmented images.

The term "PID" has been used to refer to a protocol typically employed for control loops, being a proportional integral derivative control algorithm often used in industrial and process control, as in single loop controllers, distributed control systems (DCS) and programmable logic controllers (PLC's) or programmable logic devices (PLD's). A PID control algorithm may comprise three elements, where the acronym PID derives from these terms:

Proportional—also known as gain

Integral—also known as automatic reset or simply reset

Derivative—also known as rate or pre-act

Such PID algorithm control may be employed in the segmentation of images in video processing.

Segmentation gain is controllable according to visual "noise", as the term is used herein to connote image-degrading light or light changes (such as that produced by light shining through or reflected by foliage such as that of trees) or, as stated otherwise, to connote image-degrading light or light changes or extraneous or spurious light sources which degrade the capability of the system of using video to "segment" people or other preferred subjects in the scene, that is to discriminate or separate such subjects in the scene. The noise thus interferes with getting segmented images of subject people within the scene. Activities of subject people in a captured video scene (e.g., as running, walking, loitering, aggregating in groups, or falling down) are desired to monitored by the PERCEPTRAK system for security purposes. So also, as a further example without limiting the possibilities of subjects which can be segmented for the present purposes, it may be desired that activities of moving vehicles be monitored.

Heretofore, approaches have been taken in the known art to determine motion of subjects within video fields, typically by pixel analysis. For example, it has been proposed to detect motion or differences from recent scenes. When using a so-called reference frame, or by background statistics, or by taking into consideration adjacent frames. In such technological approaches, only motion detection is typically possible. In such a prior technological approach, if a subject person stops moving in the scene of any motion detection, the person will no longer be segmented. The technique of object segmentation in accordance with the present disclosure makes use of an adaptive background of some sort. With such an adaptive background, an object can remain motionless for an indefinite time and yet can be segmented.

Approaches of the prior art typically have made use of a fixed segmentation threshold for an entire scene. The above-identified PERCEPTRAK system disclosed varying segmentation gain for an entire scene based on segmentation noise in the scene. This is referred to as adaptive segmentation gains when applied to an entire scene. It has been elsewhere proposed to adjust segmentation gain for different groups of pixels but such adjustment has heretofore been pixel-based and so also based upon intensity only.

Such problems and video analysis limitations are intended to be overcome by the presently inventive system approach and methodology.

SUMMARY OF THE INVENTION

Among the several objects, features and advantages of the invention may be noted the provision of a system and methodology for video analysis of video images, as in systems for handling video, and for use in system-interpreted analysis of video images; which improves segmentation of mixed objects in video fields; which allows accomodation for visual or light-induced noise entering a field; which allows multiple values of segmentation gain in different areas of the scene so as to improve acuity in certain areas; which selective varies video gain within regions; which adjusts for such noise over a period; which varies gain within regions or portions according to more or less, so that regions having less noise will have higher gain; which divides a video scene into a grid of many regions, on an area basis, without regard to individual pixels; which allows for rapid and long-term calculation of PID determination by software-driven processor over each of many regions; which permits an independent gain setting for each of the many regions; which captures and tracks noise data in video of scenes, as to hold data about noise in grid portions, so that in effect to map such noise, and so that the system thus remembers where such noise is occurring; which brings about improved system visual acuity in video security systems, and in particular, in the PERCEPTRAK system, such that the system is given capability to capture video data in scenes much more accurately and usefully; which greatly aids the capturing and analysis of video data to be software-interpreted for security purposes according to objects or subjects in the video captured and according to what are their activities, such as people in the scene and what they are doing, e.g., running, walking, aggregating, loitering, entering vehicles, and many other activities; which greatly improves discrimination of subjects as between different types of subjects, such as cars and people, and enhances their system-realized characterization such as by determining their directions of movement; which in general gives a video security and/or screening system the potentiality to "see better."

Among still other objects, features and advantages are the provision of a system which does not require pixel comparison; which provides object detection with adaptive background rather than reference frames; which makes use of segmentation gain (threshold) varied over time in response to segmentation noise; and in which segmentation gain is varied by individual areas adaptively to compensate for varying conditions in a video scene over time.

Briefly, in a video system, such as the above-identified PERCEPTRAK system, or another system employing video cameras, video data of scenes viewed by a video camera is analyzed for the purpose of interpretation of subjects within camera views by segmenting (separating) the subjects or objects from background of the scenes. Such analysis involves determining and controlling segmentation gain by areas of an image frame to obtain multiple values of segmentation gain in different areas of the scene. Areas found to have greater noise over a time interval are given lower gain. Areas of lesser noise are given higher gain. According to the inventive improvement, a video scene under analysis is divided into a grid having a predetermined number of areas. A single rate-of-change is not determined over an entire video scene, but rather PID is calculated by software-driven processing over each of the of predetermined number of areas. The output of PID determination is changed over a preselected time interval within each of the multiple areas, dependent upon the noise of each area, to permit independent gain setting for each of the many areas, where the gain setting for each area is determined relative to a base segmentation gain, calculated as described herein.

First General Aspect

Thus, the present disclosure is related to video segmentation wherein scene images of subjects and background are captured by video and are automatically segmented according to subject content, as by system determination of the nature of subjects, but segmentation of the subjects can be compromised by visual noise. Segmentation transformations of an original background and foreground images in the scenes are provided as a terrain map, and the segmentation may also incorporate noise blobs in the image primitives. Automatic segmentation threshold adaptation is based on measuring the segmentation noise while holding the number of noise blobs constant, whereby to achieve noise-adaptive segmentation gain. Automatic threshold adaptation within multiple areas of the scene results in different thresholds in different areas based on the amount of segmentation noise in each area.

Second General Aspect

The segmentation gain is carried out preferably by multiple passes, as in a most preferred two-pass segmentation procedure, wherein the second pass of segmentation is performed only within those parts of the target segmented in the first pass, providing the advantageous effect of filling gaps in the target that may have been left in the first pass.

The result of the operation of these improvements is increased system visual acuity in areas of low noise, and hence the system is given capability to capture video data in scenes much more accurately and usefully, providing improvement when the video data is used in the PERCEPTRAK system, where data is to be software-interpreted for security purposes according to what are subjects in the video captured and what are their activities, such as people in the scene and what they are doing, e.g., running, walking, aggregating, loitering, entering vehicles, and many other activities. So also, even subtle variations, such as limping or other non-typical gait, can be detected as will aid in identification of a human subject within protected premises. Discrimination between subjects, e.g., as between different types of subjects such as cars and people and their directions of movement, is enhanced.

Other objects and features will be apparent or pointed out below.

BRIEF DESCRIPTION OF THE DRAWINGS

Corresponding characters may indicate corresponding elements in views of the drawings.

DESCRIPTION OF PRACTICAL EMBODIMENTS

General

Figure 1:
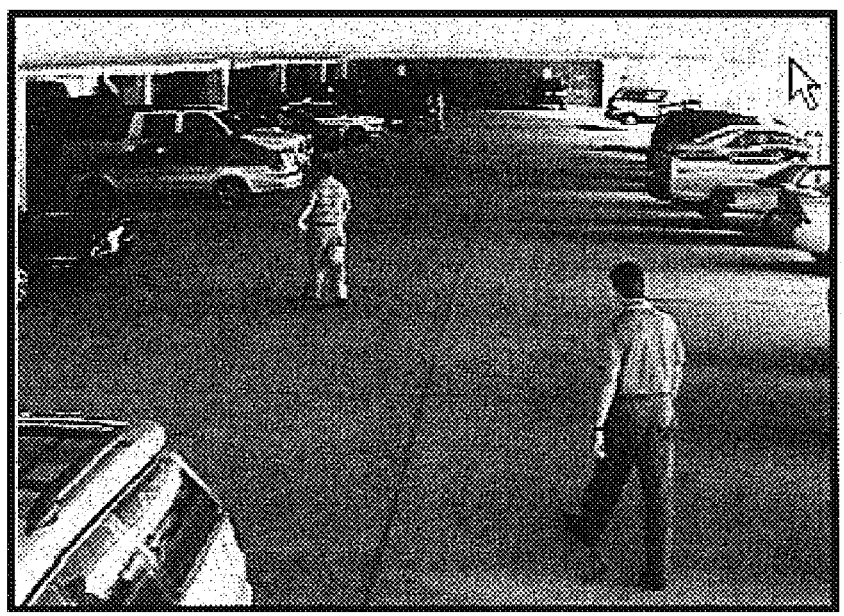
FIG. 1 is a video test frame in which there are segmented images of people, including a person at the bottom in the screen who is for test purposes a desired target.

The present invention may be used in many possible systems and schemes for video handling and image segmentation. It can be used for improving the utility of video images in various kinds of systems handling video, such as for system-interpreted analysis of video images for security purposes, and for many other purposes. As one example, in the above-identified PERCEPTRAK system, a video security system, video scenes can be captured and then segmented according to the presence of objects or subjects of interest, such as persons or vehicles. This takes place in the above-identified PERCEPTRAK system, or another system employing video cameras.

In such systems video data of scenes viewed by a video camera are analyzed for the purpose of interpretation of the subjects within camera views. Analysis of subjects involves determining and controlling segmentation gain by areas of an image frame to obtain specific analysis information. The system allows multiple values of segmentation gain in different areas of the scene. Areas found to have more noise, over a predetermined period of time, will have lower gain; but areas with less noise will have higher gain. Where scenes have visually noisy sections (such as the frequent motion of vegetation) this change will result in lesser visual acuity in areas of high activity but advantageously results in higher visual acuity in "quiet" areas.

The inventive improvement divides the scene into a grid of a predetermined number of sections, such as 48 sections (areas), for example. Rather than determining a single rate-of-change over an entire video scene, the PID function is calculated by software-driven processor over each of the of many (e.g., 48) sections. The output of PID determination changes slowly (e.g., over 2 minutes) within each of the many areas dependent upon the noise of each section. This permits an independent gain setting for each of the many sections, where the gain setting for each section is determined relative to a base segmentation gain, which is calculated in the section entitled Calculation of Base Segmentation Gain.

The noise levels by area numbers are preferably checked for every background update, while it is found sufficient if backgrounds in a security scene processed by the PERCEPTRAK system are checked substantially less frequently, such as preferably about every 20 seconds or so, but not preferably as frequently as every 10 seconds. Similarly, to check background noise level as infrequently as every 10 minutes is believed probably to be too slow. It is thought that if background updates are too far apart then adaptive background will no longer match live scene background, leading to or making excessive segmentation noise. By comparison, if updates are too frequent then segmentation noise is low, but processing cycles are wasted, and video recordation files (even those prepared by the previously disclosed system of objective selective recording) may become too large. Preferably, for present purposes, the PERCEPTRAK system is configured to adapt the update period as a function of segmentation noise build up between updates. If there is no more segmentation noise at the end of the period than at the beginning, then we're updating too fast. As an example, if there is 20% more segmentation noise at the end of the update period than at its beginning, then the update period may be considered to be too long. Between 10% and 20% build up of segmentation noise between updates is a preferred range. That is, the update interval will be determined by maintaining segmentation noise build-up in the range from about 10% to about 20% between updates and preferably not more than 20%.

It is further specifically preferred that there should not be more than a maximum of about 200 consecutive frames between updates, while generally about 100 frames may be preferred, although it will be recognized that the maximum is subject to instant revision according to prevent noise build-up from being too great.

Key Aspects

Images captured by video are segmented according to subject content, as by determining the nature of subjects, e.g., a person or persons or moving vehicle, involving interpretation of the subjects within camera views. Further principal aspects are software implemented in the present system invention, as according to the present description, to improve segmentation beyond background subtraction comprise:

1. Use of a multi-variable segmentation technique based on image primitives of a terrain map that are transformations of the original background and foreground images. (Referred to as "terrain map segmentation".)
2. Automatic threshold adaptation based on measuring the segmentation noise and holding the number of noise blobs constant. (Referred to as "adaptive gain".)
3. Two-pass segmentation where the second pass takes place only inside the outlines of targets segmented on the first pass, and using a lower threshold than the first pass. (Referred to as "gap filling".)

4. Automatic threshold adaptation within multiple areas of the scene resulting in different thresholds in different areas based on the amount of segmentation noise in each area. (Referred to as "segmentation gain by area".)

Description with Reference to Illustrations

Referring to the drawings, FIG. 1 shows a video test frame. The video in this frame is captured within a parking garage. The captured scene includes vehicles and segmented images of three people, including a person at the bottom in the screen who is for test purposes a desired target. The two persons, subjects for this purpose, closest to the camera are walking generally away from the camera. A third person is distant from the camera and is walking toward the camera.

Figure 2:
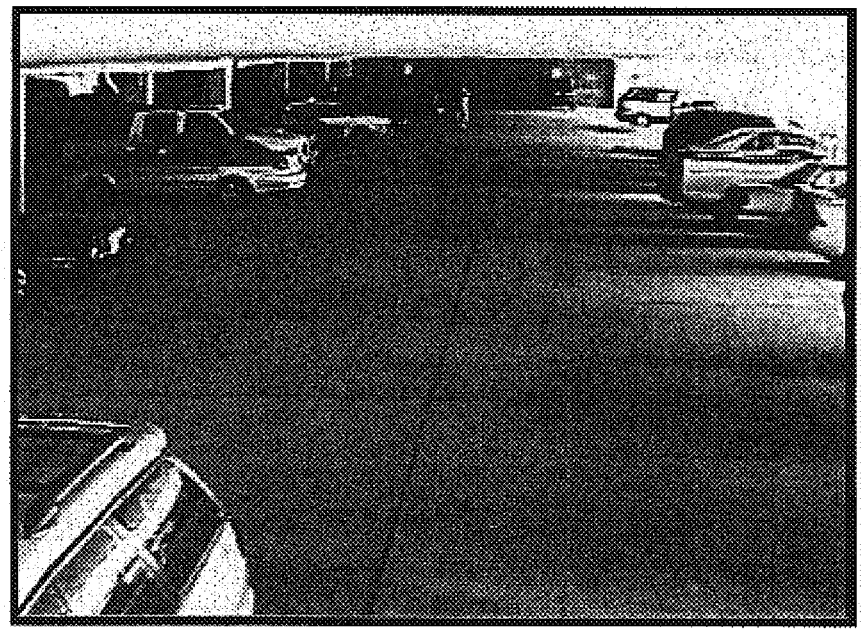
FIG. 2 is a background frame that is compared to the test frame of FIG. 1.

In FIG. 2, by comparison, there is shown a background frame which is compared to the test frame of FIG. 1.

Figure 3:
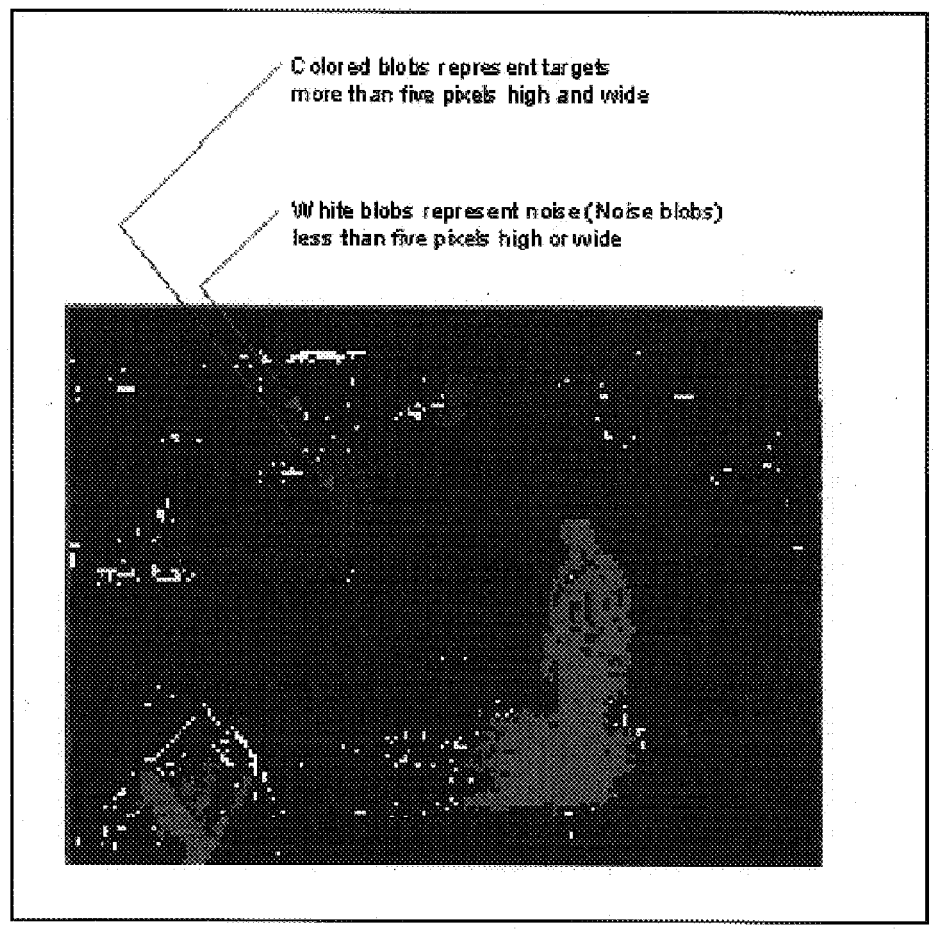
FIG. 3 is the result of subtracting the test frame from the background frame and highlighting all pixels where the difference is more than a predetermined number of pixels.

FIG. 3 shows the result of subtracting the test frame (FIG. 1) from the background frame (FIG. 2) and highlighting all pixels where the difference is more than six pixels. Contiguous segmented pixels are colored if the blob is more than five pixels high and wide. White blobs are considered noise blobs. Coloring may occur in practical use, but the present black-and-white drawings leave to the reader to infer coloring from the present description. Pixels representing the closest subject may have the color green, for example, and those representing the next closest subject purple, for example, while pixels of the subject person here shown farthest from the camera may be colored red, for example.

Figure 4:
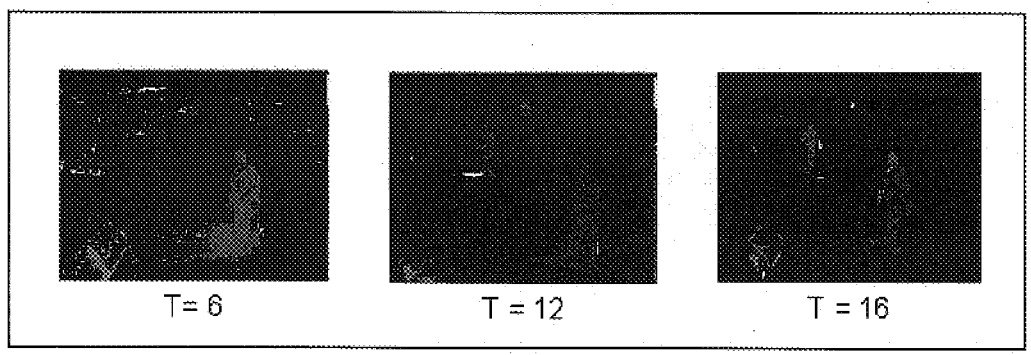
FIG. 4 illustrates the effect of segmentation threshold at different predetermined segmentation intensity values.

Segmentation of actual targets and noise is sensitive to the threshold. FIG. 4 illustrates the effect of the threshold at representative values 6, 12, and 16. At a threshold of 6 there is undesirable segmentation of shadows around the feet of the human subjects, and at a value of 16 the person at the bottom of the scene is segmented is several parts. As FIG. 4 shows, when the threshold what is considered for these purposes to be too high (16), the targets are not fully segmented and there are few noise blobs. Color shifts occur also. Thus, while not well visualized in the present black-and-white images, a true color segmentation will demonstrate that a threshold value of 16 causes the closest person segmentation to be a mix of three colors, so that full segmentation has not been achieved. When the threshold is set at what is too low for these purposes, at a value of 6, shadows at the feet of the people also are objectionably segmented. So also, a too low a threshold, many objectionable noise blobs appear in the segmentation, and show as "hash" or snow-like pixel regions near the segmented subjects.

An ideal segmentation threshold varies from scene to scene, and for any given camera, from minute to minute due to lighting changes.

The inventive system adapts to cameras, but also to changes in the scene, to maintain an ideal segmentation threshold. The system methodology of the invention treats the number of noise blobs as a meaningful measurement of the efficacy of the current segmentation threshold, and further, it adjusts the segmentation threshold to hold the number of noise blobs substantially constant.

Figure 5:
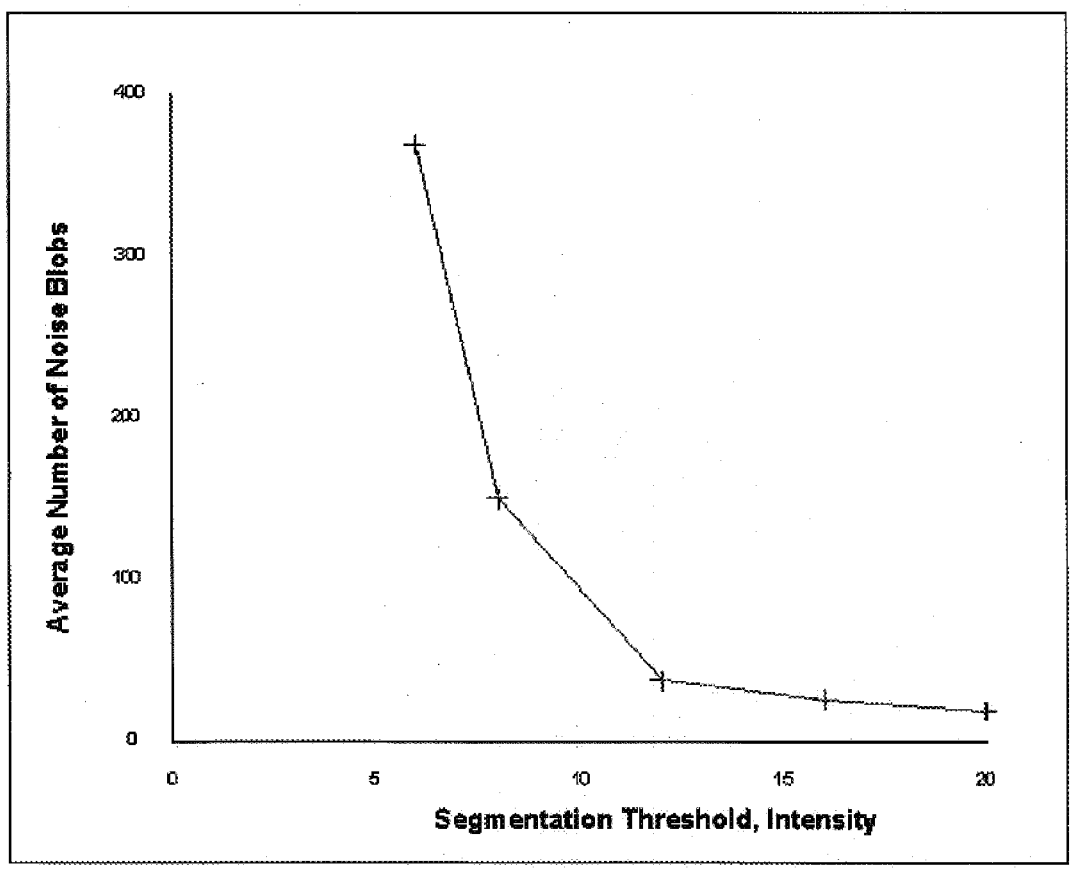
FIG. 5 is a chart plotting the relationship between noise blobs and segmentation threshold intensity as derived from tests.

FIG. 5 is a chart plotting the relationship between noise blobs and segmentation threshold intensity as derived from tests. The chart of FIG. 5 is derived from tests conducted in the preparation of this document and shows that there is a consistent and predictable relationship between segmentation threshold and the resulting number of noise blobs.

Figure 6:
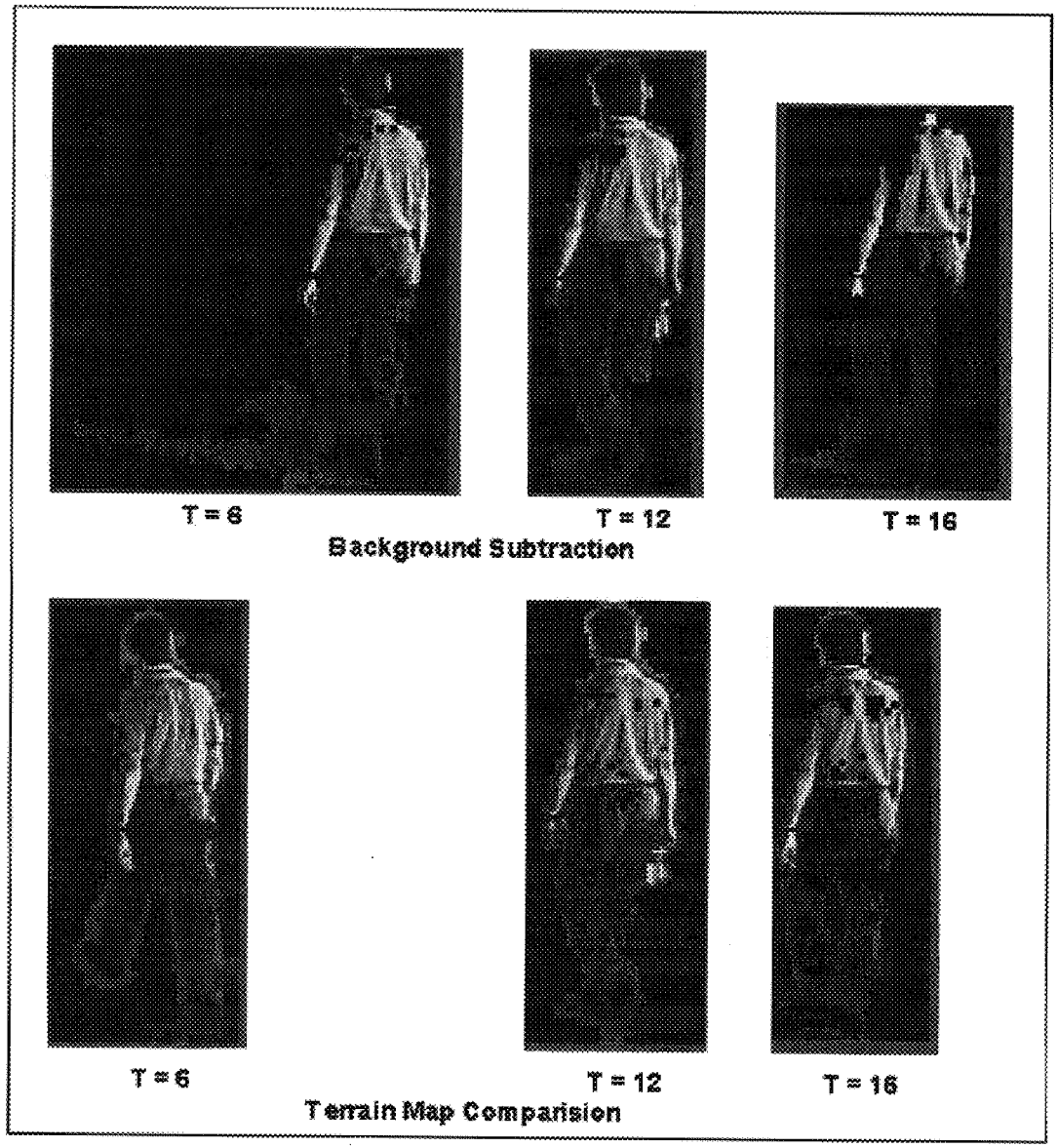
FIG. 6 is a terrain mapping comparison with a grouping of video targets which show an extent to which sensitivity of target segmentation is relative to segmentation threshold.

In FIG. 6 a terrain mapping comparison provides a grouping of video targets which show an extent to which sensitivity of target segmentation is relative to segmentation threshold. An upper set of three images is provided with background subtraction. A lower set of the same three images shows terrain map comparison. It will appear that a threshold of 6 is too low, causing excessive segmentation of shadow around the feet of the target, but a threshold of 16 is too high, as the head and part of one leg of the target fail to segment.

Figure 7:
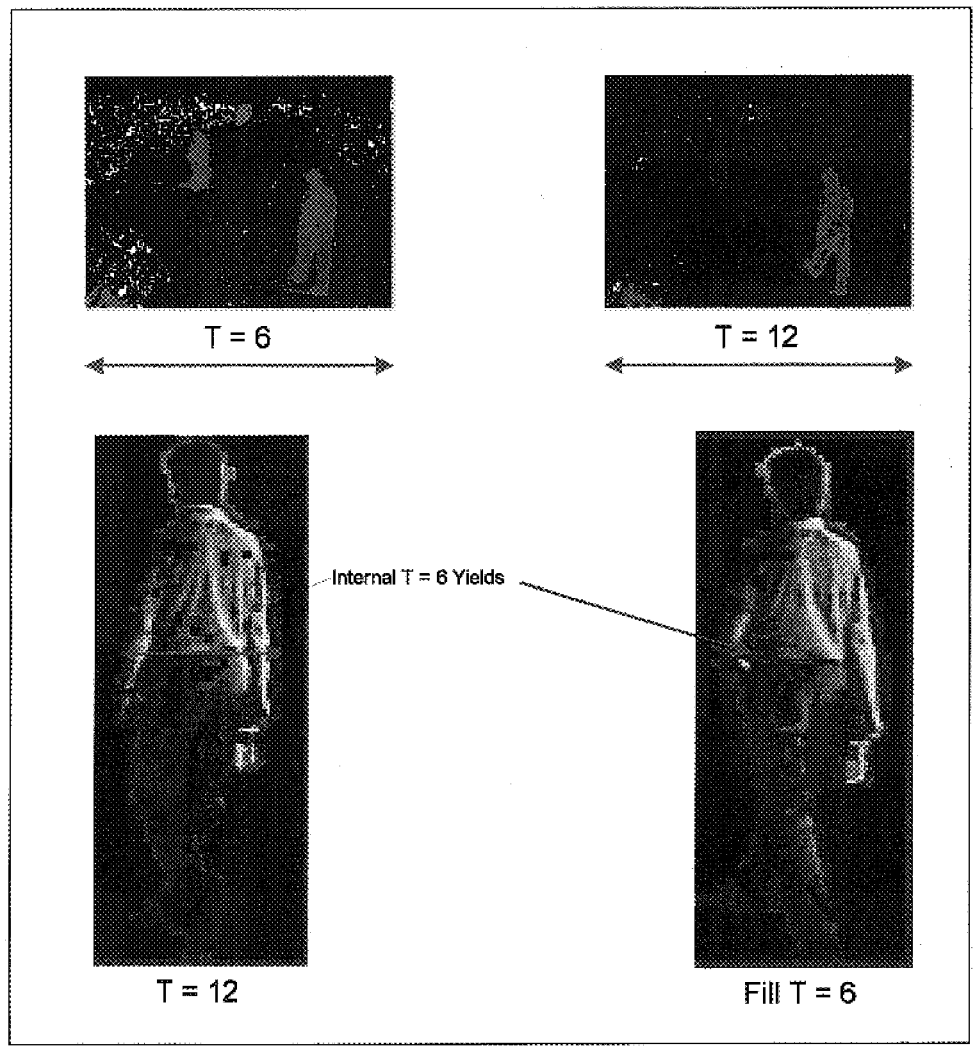
FIG. 7 is a video image field wherein targets are segmented, showing how excessive noise and false targets also are segmented, and improvement is gained by multiple-pass segmentation.

FIG. 7 is a video image field showing two pairs of panels wherein targets are segmented, showing how excessive noise and false targets also are segmented, and improvement is gained by multiple-pass segmentation, first with a threshold of 6 and then with a threshold of 12.

Even with the improved segmentation from Terrain Map comparison, no single threshold provides both full and complete segmentation of targets without excessive noise and false target segmentation that interferes with background maintenance. Any single threshold is either too low or too high.

As shown in FIG. 7, using a threshold of 6 (upper left) segments the lower subject target fully, but has excessive noise and false targets segmented. Using a threshold of 12 (upper right) provides a clean background but leaves gaps in the target. One aspect of this invention is the use of two-pass segmentation. The Target at the lower left of FIG. 7 has been segmented using a threshold of 12 with Terrain Map comparison. The target on the lower right of FIG. 7 is the result of a second pass confined to the area between the leftmost segmented pixels and the rightmost segmented pixels of the target using a threshold of one half (6) of the base threshold. The second pass fills in most of the gaps inside the target without affecting the noise in the background.

Figure 8:
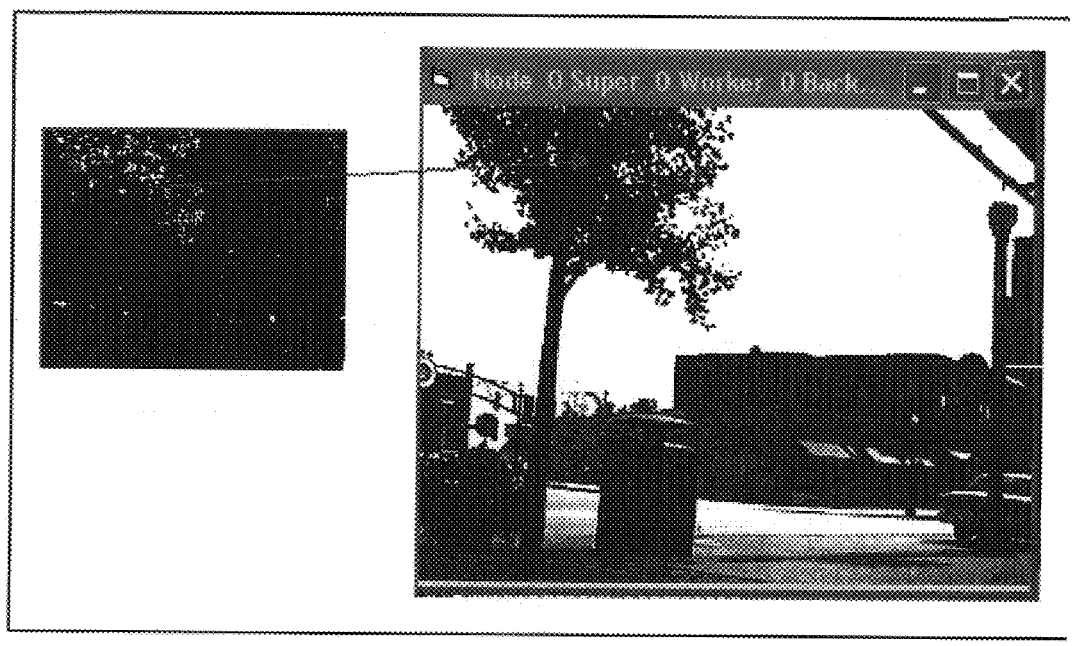
FIG. 8 is similarly a video image field grouped with a video segment in which a tree in the foreground of the image field is recognizable from bits of noise highlighted in the segment wherein white spots in the black rectangle represent noise blobs from segmentation.

FIG. 8 is similarly a video image field grouped with a video segment in which a tree in the foreground of the image field is recognizable from bits of noise highlighted in the segment wherein white spots in the black rectangle represent noise blobs from segmentation.

Figure 9:
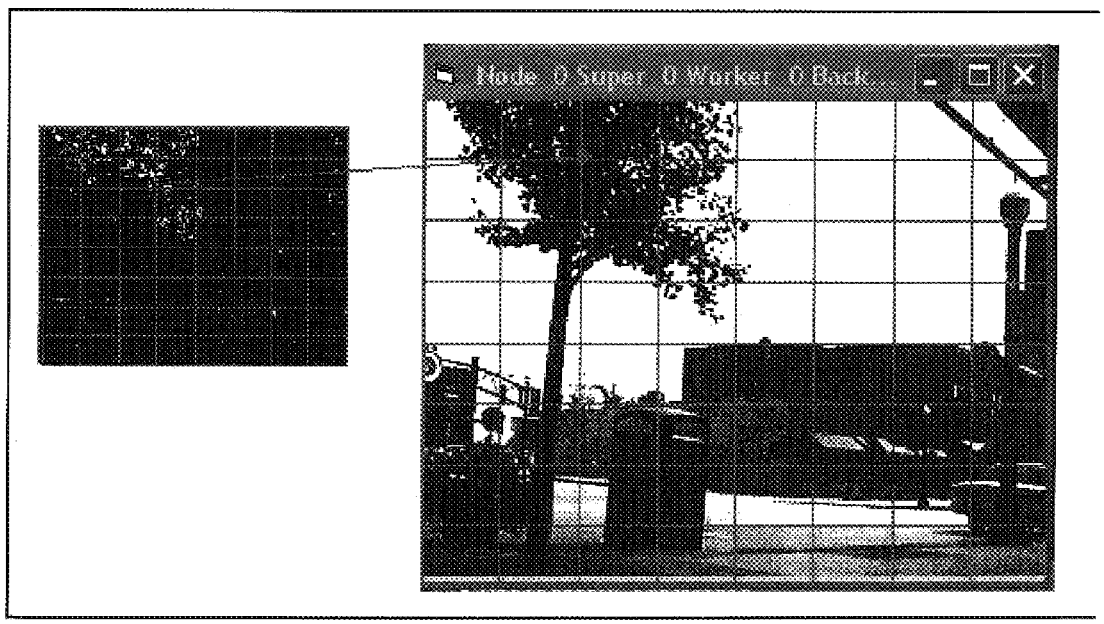
FIG. 9 is a comparable video image field, grouped with a video segment, to show that noise is reduced by video segmentation by area in accordance with the invention.

FIG. 9 is a comparable video image field, grouped with a video segment, to show that noise is reduced by video segmentation by area in accordance with the invention.

Figure 10:
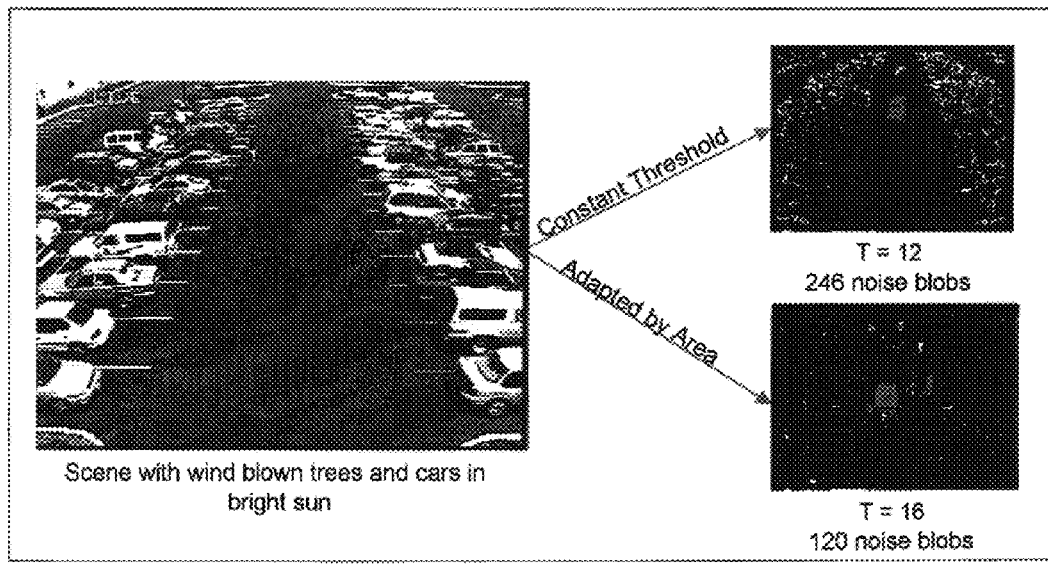
FIG. 10 is a video scene in bright sunlit conditions, including windblown tree presence, illustrating the effect of segmentation gain by area by comparing the application of a constant gain threshold to the entire scene (upper right background) compared to a scene portion at the lower right in which the video of the scene has gain adapted by plural rows and columns.

FIG. 10 illustrates the effect of segmentation gain by area by comparing the application of a constant gain threshold to the entire scene as compared with gain adapted by 48 areas. The video scene is taken in bright sunlit conditions, including rows of windblown tree between which are visually-quiet parking lot areas. Applying a constant threshold to the entire scene (upper right background) causes excessive noise and segmentation of moving tree limbs or loss of segmentation of real targets in the parking aisles. In the scene portion example at the lower right the scene has the gain adapted by 8 rows and 6 columns. The gain around the trees is lowered to require a real target in those areas to cause segmentation, yet in the aisles the gain is high enough to fully segment targets.

Figure 11:
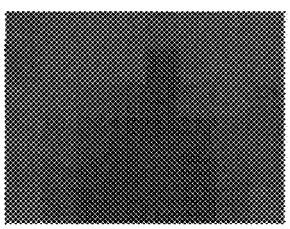
FIG. 11 shows the gain adjustments as calculated for the scene of FIG. 10 in accordance with the invention, with graphic representation of the gain adjustment by area.

FIG. 11 shows the gain adjustments as calculated in accordance with the invention for the scene of FIG. 10, with graphic representation of tabular values of the gain adjustment by area.

Terrain Map Segmentation

As will be evident from the above, FIGS. 3 through 6 illustrate the effect of the threshold on segmentation using background subtraction only, as compared with segmentation gain by area herein described. Terrain map segmentation will accordingly be considered.

The present adaptive segmentation method permits the use of multiple variables to perform segmentation. As examples of multiple variables and their use in a security system, reference may be had to above-identified application Ser. No.09/773,475 and corresponding International Patent Application PCT/US01/03639, of the same title, filed Feb. 5, 2001.

To achieve multi-variable segmentation for the present purposes, all video-derived images are transformed to a set of primitives (a "terrain map") and the segmentation performed based on the primitives. This approach uses, for example, up to eight elements of the terrain map while six would suffice for mono (i.e., gray scale video as 8 bits per pixel) to compare the map of an adaptive background to the current video frame. Each element of the terrain map is assigned a different weight (referred to as gain) in the comparison. Segmentation is based then on the comparison of all map elements with the result adjusted for the element individual weights.

For example, the elements and weights used for mono are:
ALTITUDE_WEIGHT=10
DEGREE_OF_SLOPE_WEIGHT=8
DIRECTION_OF_SLOPE_WEIGHT=1
HORIZ_SMOOTHNESS_WEIGHT=6
VERT_SMOOTHNESS_WEIGHT=6
JAGGYNESS_WEIGHT=3

As illustrated in the lower row of images of FIG. 6, segmentation by terrain map comparison is not as sensitive to changes in threshold as background subtraction. Also due to the use of other variables less shadow is segmented from the same scene with terrain map comparison.

EXAMPLE 1

It is found in practice that the segmentation gain loop has been very stable with a single setting for the entire video scene. By comparison, at attempt to set segmentation gain for every pixel would certainly be unstable. Therefore, to maintain stability, and yet have the benefit of segmentation gain by area as herein described, the number of settings could be purposely limited to a predetermined number of value (such as 4, for example for illustrative purposes only). Further, the minimum area of the screen to have an independent gain setting will be limited to $\frac{1}{64}^{th}$ of the screen, as an example for illustrative purposes. FIG. 2 illustrates the effect of an eight by eight grid of a scene to be analyzed as according to the PERCEPTRAK system. Calculations will be generic to allow tuning the grid resolution. As according to that disclosure, to enable generic calculations, the number of grids will be determined by global variables SegGridsHigh and SegGridsWide. For this example both SegGridsHigh and SegGridsWide is set to 8 for initial testing.

For calculation of base segmentation gain, both SigValueDif and SigFeatureDif are revised to use only the noise blobs in the segmentation grids that are entirely inside the active area of the mask. The SigBalDif value continue to be calculated by a PI algorithm based on the total noise blobs, but SegGrids outside of the active mask is not counted. The intent is to adjust segmentation up or down from the base value by grid to hold the total noise from segmentation constant.

To compensate for a smaller active mask area and keep the meaning of NoiseBlobs the same for all cameras, AverageNoise blobs will be adjusted upward by the number of inactive Segmentation Grids:

AverageNoiseBlobs=AverageNoiseBlobs* (TotalSegGrids/ActiveSegGrids)

Reference may be had to other examples setting forth representative lines of code of Visual Basic useful in implementing the present methodology and system configuration.

EXAMPLE 2

This example illustrates the presently disclosed method of tracking noise by location. Reference again may be had to other examples setting forth representative lines of code of Visual Basic useful in implementing the present methodology and system configuration.

A new UDT (in the context of Visual Basic a "User Defined Type" is defined to hold data about noise in grids, (NoiseBySegGridType), with three longs (i.e., a 32 bit integer), thus:

| | InActiveMask | // set to 1 at start up if |
|---|---|---|
| in | | the active area of the |
| mask | NoiseBlobThisPeriod | // Cum NoiseBlobs since |
| last | | |
| | NoiseBlobsLastPeriod | CalcSegmentationValues // NoiseBlobs used in last CalcSegmentationValues |

The NoiseBlobsLastPeriod element is reserved for the 'D' part of a PID loop. A new global UDT (NoiseBySegGrid) is allocated and used to accumulate the number of noise blobs for each map element. NoiseBySegGrid is allocated as SegGridsHigh*SegGridsWide.

In the LabelBlobs function where Noise Blobs in incremented, the element of NoiseBySegGrid at the location of the noise blob will be incremented.

At the time of background maintenance after new segmentation gains are calculated, NoiseBlobsThisPeriod will be copied to the NoiseBlobsLastPeriod elements, and NoiseBlobsThisPeriod elements will be reset to all zeroes.

At the line with (*Noiseblobs)++; Vari 'i' is lower row of the blob and vari 'j' is leftmost column of the blob.

So add:
SegGridRow=i/SegGridsHigh;
SegGridCol=j/SegGridsWide;
SegOffset=(SegGridRow*SegGridsWide)+SegGridCol;
*(NoiseBySegGrid+SegOffset)->NoiseBlobsThisPeriod++;

This marks the NoiseBySegGrid.NoiseBlobsThisPeriod as having a noise blob for this frame.

Each element InActiveMask will be set to 1 during start up chores and every time the mask is updated if its four corner pixels are in the active mast. This is not a comprehensive calculation but runs at fast speed.

EXAMPLE 3

The example typifies calculation of gain adjustment. Reference may be had again to other examples setting forth representative lines of code of Visual Basic useful in implementing the present methodology and system configuration.

Gain adjustment by area is based on a gain figure for DeltaSegmentation per DeltaNoise. The variable is named "DeltaSegGain" and the default value is to be set by test. A DeltaSegGain of 0.5 indicates an adjustment of one for each two noise blobs difference between the area under consideration and the screen average, where:

GainAdjustment=DeltaSegGain*(GridNoise−AverageScreenNoise)

and where:
a higher GainAdjustment means a lower gain for the Grid;

and where:

AverageScreenNoise is adjusted for comparison with GridNoise.

For an example with 64 grids, the total number of noise blobs in the 1/64$^{th}$ grid is to be compared to the total number of noise blobs in the scene divided by 64.

For each background maintenance operation, a PI loop of each Analysis Worker of the PERCEPTRAK system adjusts the value of DeltaSegGain to drive the DeltaNoise across all areas to zero in this way:

1. Sum the number of noise blobs from the 8×8 grid. Transfer values to the sum only where the InActiveMask element equals 1.
2. Calculate the average noise for each grid element.
3. Calculate the weighted noise blobs per area.
4. Calculate the Gain Adjustment for each grid.
5. Set the GainAdjust for each TerrainMap element of the background map.

For gain adjustment during segmentation, a new (signed character) element, GainAdjust, can be added to the Terrain Map declaration. The GainAdjust element (of the background terrain map) will be filled out during each background maintenance operation and used to modify both SigValueDif and SigFeatureDif in the Compare TerrainMap XXX functions.

Those skilled in the art may of course recognize that the foregoing will require some changes to the compare terrain map functions since the segmentation gain has to be checked every map element, but with the expectation that calculation will run fast with the new gain adjustment in the same background map element to be compared.

EXAMPLE 4

The example sets forth sample code for the gain adjustment calculation. The following code fragment is derived from the software program used to develop the images of the Figures. The code is included here as an example of a software implementation of adaptive segmentation gain by area. The variable names are self-explanatory.

```
NormFullScreenAvgFactor = TotalSegGrids / SamplesForNoiseByGridInPeriod
```

```
-continued

GridsCounter = −1
For GridRowCounter = Lng0 To SegGridsHigh − 1
    For GridColCounter = Lng0 To SegGridsWide − 1
        GridsCounter = GridsCounter + 1
        NormalizedGridNoise = NormFullScreenAvgFactor *
            NoiseByGrid(GridsCounter) .NoiseBlobsThisPeriod
        ThisGridGain = DeltaSegGain * (NormalizedGridNoise −
            NoiseBlobsSetPoint)     ' frame and grid
based
        ThisGridGain = Max (ThisGridGain, LngMinus2)
        ThisGridGain = Min(ThisGridGain, Lng2)
        GainAdjustment(GridsCounter) =
GainAdjustment(GridsCounter)
            + ThisGridGain
        MaxAdjustment = Lng40
        MinAdjustment = LngMinus20
        GainAdjustment(GridsCounter) = Max(MinAdjustment,
        GainAdjustment(GridsCounter))
        GainAdjustment(GridsCounter) = Min(MaxAdjustment,
        GainAdjustment(GridsCounter))
    Next GridColCounter
Next GridRowCounter
```

EXAMPLE 5

The example illustrates a preferred procedure by which segmentation gain is carried out preferably by multiple passes, most preferably as in a two-pass segmentation procedure by which the second pass of segmentation is performed only within those parts of the target that already were segmented in the first pass. This provides the highly advantageous effect of filling gaps in the target that may have been left in the first pass. In this example, sample code is provided for a function Pass2Segmentation, being an example of preferred code with exception handling removed for clarity. The input TerrainMap is an array of structures with the results of the first pass segmentation. TargetROI defines the bounding rectangle that holds the input target TargetNumber. Each element of the Terrain map includes the absolute value of the difference between the background and test frame found in the first pass of segmentation. The second pass of segmentation will only be performed within the target parts segmented in a first pass. Code:

```
long WINAPI Pass2Segmentation(RECT TargetROI,   // RECT structure with bounding
                                                   rectangle of the target
                              long TargetNumber,  // Number of the target to be
segmented
                                                   on this pass
                              TerrainMap * MapWithTarget,  // The terrain map with the
                                                   target and Intensity difference
                              long Pass2Threshold)  // The threshold to use this second
pass
{
    long TargetLeft,TargetRight,TargetTop, TargetBottom;  // The sides of the bounding rectangle
                                                   of the target
    long RightMostSegmented, LeftMostSegmented;  // The right most and leftmost
                                                   segmented elements in each row
    long TargetRow, TargetCol;                   // Row and column being worked on,
                                                   relative to the terrain map.
    long NumberOfElementsSegmented;              // return the number of map elements
                                                   that are segmented on this pass
        TargetLeft = TargetROI.left;
        TargetRight = TargetROI.right;
        TargetTop = TargetROI.top;
        TargetBottom = TargetROI.bottom;
```

-continued

```
        NumberOfElementsSegmented = 0;              // initial set, increment on each
                                                    segmented map element
        for (TargetRow = TargetBottom; TargetRow =< TargetTop; ++TargetRow)
        {
                                                    // find the left most segmented
                                                    element in this row
                for (TargetCol = TargetLeft; Targetcol =< TargetRight; ++TargetCol)
                {
                        if (MapWithTarget[TargetRow][TargetCol].TargetNumber =
TargetNumber)
                                                    // then this is the left most
                                                    element in this row
                        {
                            LeftMostSegmented = TargetCol; // mark it down
                            break;                  // stop looking in this row
                        }
                }
                                                    // find the right most segmented
                                                    element in this row
                for(TargetCol = TargetRight; TargetCol => TargetLeft; --TargetCol
                {
                        if (MapWithTarget[TargetRow][TargetCol].TargetNumber =
TargetNumber)
                                                    // then this is the left most
                                                    element in this row
                        {
                            RightMostSegmented = Targetcol;
                                                    // mark it down
                            break;                  // stop looking in this row
                        }
                }
                for (TargetCol = LeftMostSegmented; TargetCol =< RightMostSegmented;
++TargetCol)
                {                                   // use Pass2Threshold within the
                                                    bounds of the target on this row
                        if((MapWithTarget[TargetRow][TargetCol].TargetNumber !=
TargetNumber)
                                                    // this element has not been segmented
                            && (MapWithTarget[TargetRow][TargetCol].AltDiff >=
Pass2Threshold))
                                                    // and its more diff from background
                        {
                            MapWithTarget[TargetRow][TargetCol].TargetNumber =
TargetNumber
                        }                           // end of element was not segmented
on
                                                    the first pass but is segmented here
        }                                           // end of Targetcol =
        LeftMostSegmented
                                                    to RightMostSegmented
        }                                           // end of for bottom row to top row
        return(NumberOfElementsSegmented);          // this return value increases
                                                    as function fills more gaps in target.
}/*XXXXXXXXXXXX end of the Pass2Segmentation function
XXXXXXXXXXXXXXXXXXXXXXXXXXXXXX*/
```

The return value is the number of map elements that were segmented in the second pass.

As various modifications could be made in the systems and methods herein described and illustrated without departing from the scope of the invention, it is intended that all matter contained in the foregoing description or shown in the accompanying drawings shall be interpreted as illustrative rather than limiting.

Thus, the breadth and scope of the present invention should not be limited by any of the above-described exemplary embodiments, but should be defined only in accordance with the following claims appended hereto and their equivalents.

What is claimed is:

1. In a system for capturing video of scenes, including a processor-controlled segmentation system for providing software-implemented segmentation of subjects of interest in said scenes based on processor-implemented interpretation of the content of the captured video, the improvement comprising software implementation for determining and controlling segmentation gain by areas of an image frame to obtain multiple values of segmentation gain in different areas of the scene according to visual noise level in said areas, wherein said scenes are divided into a grid having a predetermined number of areas, and wherein said software implementation calculates proportional integral derivative over each of the of predetermined number of areas according to the noise of each area, to permit independent gain setting for each of the areas, where the gain setting for each section is determined relative to a base segmentation gain.

2. In a system as set forth in claim 1, said threshold being automatically based on measurement of the segmentation noise, wherein segmentation noise is determined by measuring the number of noise blobs for segmented subjects of interest, and the system maintains the number of noise blobs constant for segmented subjects of interest.

3. In a system as set forth in claim 2, wherein the noise levels by area numbers are periodically checked at frequent intervals for subject segmentation and backgrounds noise levels are checked substantially less frequently.

4. In a system as set forth in claim 3, wherein the determination of noise levels is updated at an update interval which is a function of segmentation noise build-up between updates.

5. In a system for capturing video of scenes, including a processor-controlled segmentation system for providing software-implemented segmentation of subjects of interest in said scenes based on processor-implemented interpretation of the content of the captured video, the improvement comprising software implementation for determining and controlling segmentation gain by areas of an image frame to obtain multiple values of segmentation gain in different areas of the scene according to visual noise level in said areas, said software implementation controlling video gain in respective ones of said areas wherein subjects in said scenes are segmented according to a segmentation threshold based upon visual noise in segmentations of said subjects, said threshold being automatically based on measurement of the segmentation noise wherein the noise levels by area numbers are periodically checked at frequent intervals for subject segmentation and backgrounds noise levels are checked substantially less frequently, and wherein the determination of noise levels is updated at an update interval determined by maintaining segmentation noise build-up in the range from about 10% to about 20%, and preferably not more than 20%, between updates.

6. In a video segmentation system wherein scene images captured by video are automatically segmented according to subject content as by system determination of the nature of subjects, wherein scenes have both background and subjects may appear in the foreground, wherein segmentation of the subjects could be compromised by visual noise, wherein segmentation transformations of an original background and foreground images in scenes are provided as a terrain map, and wherein the segmentation may also incorporate noise blobs caused by the visual noise, which produces segmentation noise, the improvement comprising:

employing automatic segmentation threshold adaptation based on measuring the segmentation noise while holding the number count of noise blobs substantially constant, whereby to achieve adaptive segmentation gain; and using automatic threshold adaptation within multiple areas of the scene resulting in different possible thresholds in different areas based on the amount of segmentation noise in each area.

7. In a system as set forth in claim 6, the improvement further characterized by:

said segmentation as carried out by two-pass sequence wherein the second pass takes place only inside the outlines of targets segmented on the first pass, and wherein the second pass uses a lower threshold than the first pass.

8. In a system as set forth in claim 6, the improvement further characterized by:

said segmentation employing a multi-variable segmentation technique based on image primitives of a terrain map that are transformations of the original background and foreground images in scenes.

9. A video processing method of automatically segmenting of subjects within a video scene, comprising:

determining and controlling segmentation gain by areas of an image frame to obtain different possible multiple values of segmentation gain in different areas of the scene according to the level of visual noise in the different areas, wherein scene areas of lesser noise are given higher segmentation gain, wherein a video scene for segmentation is divided into a grid having a predetermined number of areas, wherein software-driven processing determines segmentation gain over each of the of predetermined number of areas, and wherein segmentation gain is determined by proportional integral derivative control algorithm to provide automatic independent gain setting for each of the many areas, where the gain setting for each segment is determined relative to a base segmentation gain, and wherein a a single rate-of-change is not determined over an entire video scene.

10. A video processing method of automatically segmenting of subjects within a video scene, comprising:

determining and controlling segmentation gain by areas of an image frame to obtain different possible multiple values of segmentation gain in different areas of the scene according to the level of visual noise in the different areas, wherein scene areas of lesser noise are given higher segmentation gain, wherein a video scene for segmentation is divided into a grid having a predetermined number of areas, wherein software-driven processing determines segmentation gain over each of the of predetermined number of areas, wherein image segmentation is carried out by two pass sequence wherein the second pass takes place only inside the outlines of targets segmented on the first pass, and wherein the second pass uses a lower threshold than the first pass.

* * * * *